(12) United States Patent
Ueta et al.

(10) Patent No.: US 12,163,825 B2
(45) Date of Patent: *Dec. 10, 2024

(54) WORK MACHINE

(71) Applicant: KOBELCO CONSTRUCTION MACHINERY CO., LTD., Hiroshima (JP)

(72) Inventors: Toshiro Ueta, Hiroshima (JP); Michio Hirayama, Hiroshima (JP); Kazuomi Endo, Hiroshima (JP)

(73) Assignee: KOBELCO CONSTRUCTION MACHINERY CO., LTD., Hiroshima (JP)

(*) Notice: Subject to any disclaimer, the term of this patent is extended or adjusted under 35 U.S.C. 154(b) by 0 days.

This patent is subject to a terminal disclaimer.

(21) Appl. No.: 17/642,008

(22) PCT Filed: Sep. 2, 2020

(86) PCT No.: PCT/JP2020/033296
§ 371 (c)(1),
(2) Date: Mar. 10, 2022

(87) PCT Pub. No.: WO2021/065313
PCT Pub. Date: Apr. 8, 2021

(65) Prior Publication Data
US 2024/0044110 A1    Feb. 8, 2024

(30) Foreign Application Priority Data
Sep. 30, 2019  (JP) ................. 2019-180425

(51) Int. Cl.
G01G 19/08  (2006.01)
E02F 3/43  (2006.01)
(Continued)

(52) U.S. Cl.
CPC .......... *G01G 19/083* (2013.01); *E02F 3/435* (2013.01); *G01G 19/14* (2013.01); *E02F 3/28* (2013.01);
(Continued)

(58) Field of Classification Search
CPC ....... G01G 19/083; G01G 19/14; E02F 3/435; E02F 3/28; E02F 9/24; E02F 9/26;
(Continued)

(56) References Cited

U.S. PATENT DOCUMENTS 9,938,692 B2 *  4/2018  Shatters ................. E02F 9/264
2019/0017249 A1  1/2019  Uji et al.
(Continued)

FOREIGN PATENT DOCUMENTS

CN  107268699 A  10/2017
JP  9-203087 A  8/1997
(Continued)

OTHER PUBLICATIONS

Letsdig 18, "Excavator Load Weighing System", Sep. 16, 2018, YouTube (Year: 2018).*
(Continued)

*Primary Examiner* — Abby Y Lin
*Assistant Examiner* — Karston G. Evans
(74) *Attorney, Agent, or Firm* — Oblon, McClelland, Maier & Neustadt, L.L.P.

(57) ABSTRACT

A work machine includes: a load acquisition section which acquires a load of an object held by an attachment; and an estimative load determination part which determines, based on the load acquired by the load acquisition section, an estimative load of the object estimated to be discharged at a position above a destination in a discharge task when a predetermined estimative load determinative criterion is satisfied. The estimative load determinative criterion
(Continued)

includes at least one of a criterion that a boom rising speed at which a boom rises in a rising direction reduces in a holding task, and a criterion that the boom rising speed reduces in a carrying task.

7 Claims, 6 Drawing Sheets

(51) Int. Cl.
    *G01G 19/14*     (2006.01)
    *E02F 3/28*     (2006.01)
    *E02F 9/24*     (2006.01)
    *E02F 9/26*     (2006.01)

(52) U.S. Cl.
    CPC . *E02F 9/24* (2013.01); *E02F 9/26* (2013.01); *E02F 9/264* (2013.01)

(58) Field of Classification Search
    CPC ..... E02F 9/264; E02F 3/36; E02F 3/38; E02F 3/40; E02F 9/20; E02F 9/22
    See application file for complete search history.

(56) References Cited

U.S. PATENT DOCUMENTS

| | | |
|---|---|---|
| 2019/0055716 A1 | 2/2019 | Ishihara et al. |
| 2020/0040554 A1 | 2/2020 | Nishimura |
| 2020/0208373 A1* | 7/2020 | Nakamura ................ E02F 9/24 |
| 2020/0340213 A1* | 10/2020 | Zimmerman .......... G01G 19/12 |
| 2022/0341123 A1* | 10/2022 | Ueta ....................... E02F 9/264 |
| 2022/0389681 A1* | 12/2022 | Ueta ........................ E02F 9/24 |

FOREIGN PATENT DOCUMENTS

| | | | |
|---|---|---|---|
| JP | 2001099701 A | * | 4/2001 |
| JP | 2015-155615 A | | 8/2015 |
| JP | 2018-24997 A | | 2/2018 |
| JP | 2018-188831 A | | 11/2018 |
| WO | WO 2018/051536 A1 | | 3/2018 |

OTHER PUBLICATIONS

International Search Report issued Nov. 24, 2020 in PCT/JP2020/033296 filed Sep. 2, 2020, 2 pages.

* cited by examiner

WORK MACHINE

TECHNICAL FIELD

The present invention relates to a work machine, such as a hydraulic excavator.

BACKGROUND ART

Work machines, such as hydraulic excavators, have been conventionally known. Each of the hydraulic excavators includes a working device including: a boom; an arm; and a bucket. The hydraulic excavator performs a loading work for loading an object of a work, such as soil and sand, to a destination, e.g., a dump truck, on a work site. Specifically, the loading work includes: a holding task (excavation task) of excavating the soil and sand by the backet and holding the excavated soil and sand by the bucket; a carrying task of carrying the soil and sand held by the bucket to a position above the dump truck which is the destination; and a discharge task (soil discharge task) of discharging the soil and sand from the bucket at the position above the dump truck. The hydraulic excavator is known to be mounted with a payload function. The payload function serves to measure a load of the soil and sand held by the bucket. Operative execution of the payload function in a loading operation to the dump truck by the hydraulic excavator enables calculation of an amount of the soil and sand loaded to the dump truck.

Patent Literature 1 discloses a technology for properly grasping a load of an excavated matter loaded to a dump truck by accurately detecting a loading operation to the dump truck (Paragraph [0005] of Patent Literature 1). In a hydraulic excavator disclosed in Patent Literature 1, an operation of the hydraulic excavator is determined as the loading operation of loading the excavated matter to the dump truck under the condition that the bucket has moved across a reference height level, and a load value of a load is determined by a loading determination unit (paragraphs [0104] to [0107] of Patent Literature 1). The reference height level is set by a user of the hydraulic excavator (paragraph [0044] of Patent Literature 1).

However, a height level to which the bucket is raised for loading the soil and sand to the dump truck in the loading work varies depending on a height level difference between the ground where the hydraulic excavator is located and the ground where the dump truck is located. Besides, the height level to which the bucket is raised for loading the soil and sand to the dump truck in the loading work further varies depending on a height level difference between an excavation position and the ground where the dump truck is located. Each height level difference depends on a situation of a work site. It is seen from these perspectives that the technology disclosed in Patent Literature 1 requires an operator of the hydraulic excavator to perform a cumbersome setting operation of changing the setting of the reference height level depending on a situation of the work site.

CITATION LIST

Patent Literature

Patent Literature 1: Japanese Unexamined Patent Publication No. 2018-188831

SUMMARY OF INVENTION

The present invention has an object of providing a work machine which can acquire a load of an object to be discharged from an attachment, such as a bucket, at a position above a destination without a cumbersome setting operation depending on a situation of a work site.

Provided is a work machine which performs a holding task of holding an object of a work, a carrying task of carrying the object being held to a position above a destination, and a discharge task of discharging the object at the position above the destination. The work machine includes: a machine body; a working device which includes a boom tiltably supported on the machine body, and an attachment for holding the object; a load acquisition section which acquires a load of the object held by the attachment; and an estimative load determination part which determines, based on the load acquired by the load acquisition section, an estimative load of the object estimated to be discharged at the position above the destination in the discharge task when a predetermined estimative load determinative criterion is satisfied. The estimative load determinative criterion includes at least one of a criterion that a boom rising speed at which the boom rises in a rising direction reduces in the holding task, and a criterion that the boom rising speed reduces in the carrying task.

DESCRIPTION OF EMBODIMENTS

Hereinafter, a preferable embodiment of the present invention will be described with reference to the accompanying drawings.

Figure 1:
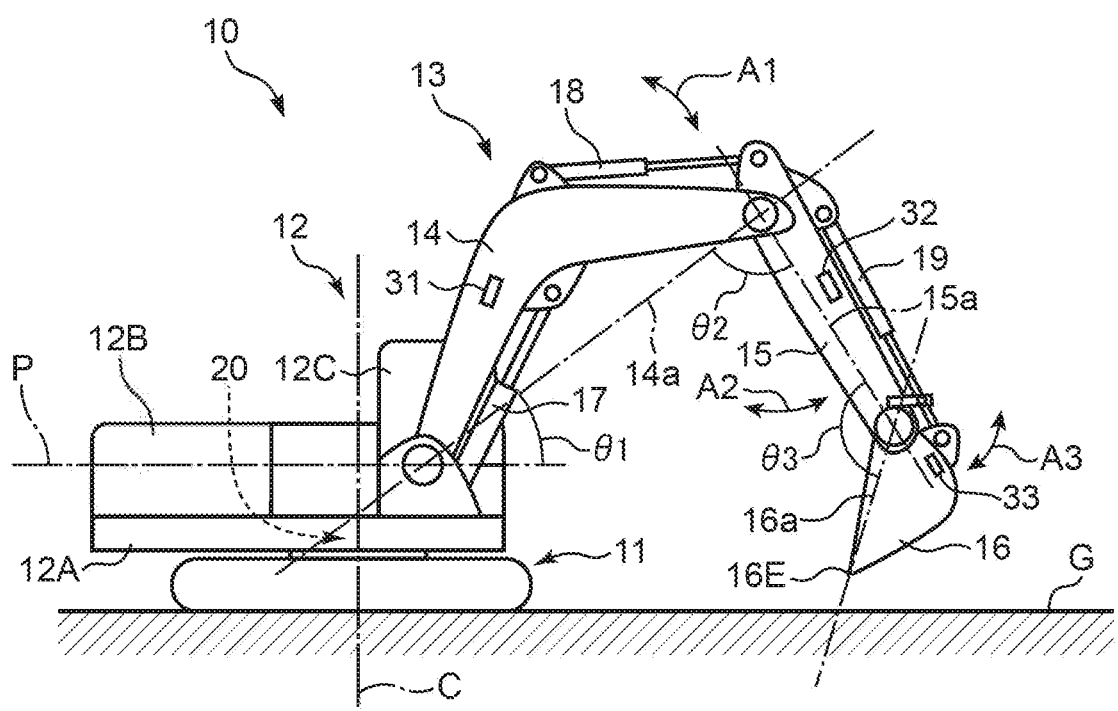
FIG. 1 is a sideview of a hydraulic excavator which is an example of a work machine according to an embodiment of the present invention.
Figure 2:
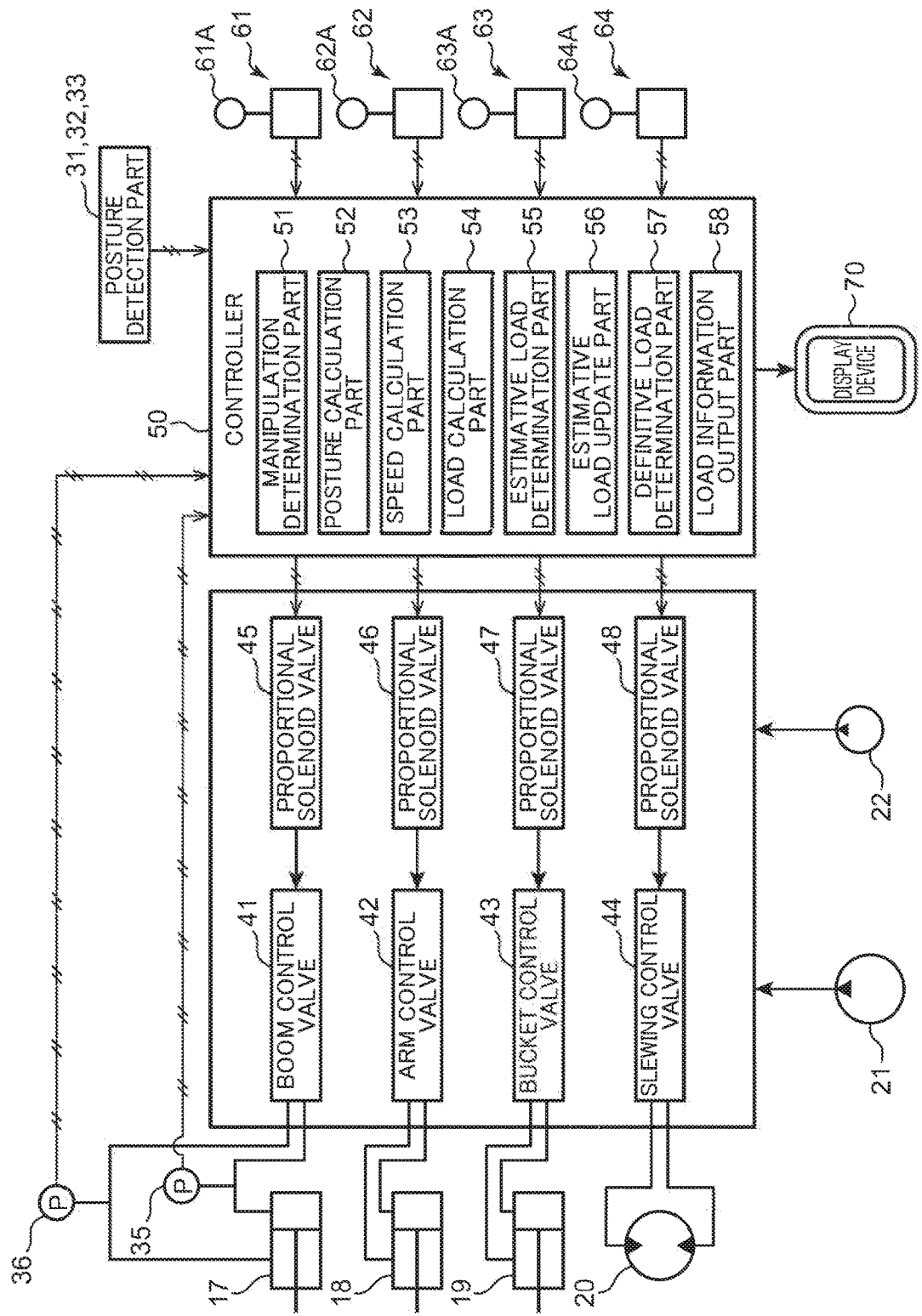
FIG. 2 is a view showing a configuration of a controller mounted on the hydraulic excavator and a circuit controlled by the controller.

FIG. 1 shows a hydraulic excavator which is an example of a work machine according to an embodiment of the present invention. FIG. 2 is a view showing a configuration of a controller mounted on the hydraulic excavator and a circuit controlled by the controller.

As shown in FIG. 1 and FIG. 2, a hydraulic excavator 10 includes: a lower traveling body 11; an upper slewing body 12 slewably mounted on the lower traveling body 11; a working device 13 mounted on the upper slewing body 12; a plurality of hydraulic actuators; at least one hydraulic pump 21; a pilot pump 22; a plurality of manipulation devices; a plurality of control valves; a plurality of pressure sensors; a posture detection part; and a controller 50.

The lower traveling body 11 and the upper slewing body 12 constitute a machine body which supports the working device 13. The lower traveling body 11 has an unillustrated traveling device causing the hydraulic excavator 10 to travel, and thus can travel on the ground G. The upper slewing body 12 has a slewing frame 12A, and an engine room 12B and a cab 12C mounted thereon. The engine room 12B accommodates an engine, and the cab 12C has a seat which allows an operator to sit thereon, various manipulation levers, and various manipulation pedals.

The working device 13 includes a plurality of movable parts which can perform a loading work for loading soil and sand to a dump truck. The movable parts include a boom 14, an arm 15, and a bucket 16. The soil and sand exemplifies an object of the work, the dump truck exemplifies a destination, and the bucket 16 exemplifies an attachment.

The loading work includes; a holding task (excavation task) of excavating the soil and sand and holding the excavated soil and sand by the bucket 16; a carrying task of carrying the soil and sand being held to reach right above the dump truck; and a discharge task (soil discharge task) of discharging the soil and sand at a position above the dump truck. The soil and sand discharged in the discharge task drop from the bucket 16 to be loaded to the dump truck.

The boom 14 has a proximal end supported on a front portion of the slewing frame 12A tiltably, i.e., rotatably about a horizontal axis, as indicated by arrow A1 in FIG. 1, and a distal end opposite to the proximal end. The arm 15 has a proximal end attached to the distal end of the boom 14 rotatably about a horizontal axis as indicated by arrow A2 in FIG. 1, and a distal end opposite to the proximal end. The bucket 16 has a proximal end attached to the distal end of the arm 15 rotatably about a horizontal axis as indicated by arrow A3 in FIG. 1.

The hydraulic actuators include a plurality of hydraulic cylinders and a slewing motor 20. The hydraulic cylinders include at least one boom cylinder 17 which moves the boom 14, an arm cylinder 18 which moves the arm 15, and a bucket cylinder 19 which moves the bucket 16.

Although FIG. 2 illustrates only the singe hydraulic pump 21, the hydraulic excavator 10 may include a plurality of hydraulic pumps.

The at least one boom cylinder 17 is located between the upper slewing body 12 and the boom 14, and extends or contracts by receiving a supply of a hydraulic fluid discharged from the hydraulic pump 21 to thereby cause the boom 14 to rotate in a rising direction or a lowering direction indicated by the arrow A1.

The arm cylinder 18 is located between the boom 14 and the arm 15, and extends or contracts by receiving a supply of the hydraulic fluid to thereby rotate the arm 15 in an arm pulling direction or an arm pushing direction indicated by the arrow A2. The arm pulling direction is a direction in which the distal end of the arm 15 moves closer to the boom 14, and the arm pushing direction is a direction in which the distal end of the arm 15 moves away from the boom 14.

The bucket cylinder 19 is located between the arm 15 and the bucket 16, and extends or contracts by receiving a supply of the hydraulic fluid to thereby rotate the bucket 16 in a bucket pulling direction or a bucket pushing direction indicated by the arrow A3. The bucket pulling direction is a direction in which an angle $\theta 3$ between a straight line 15$a$ representing a longitudinal direction of the arm 15 shown in FIG. 1 and a straight line 16$a$ representing a direction of the bucket 16 decreases, and the bucket pushing direction is a direction in which the angle $\theta 3$ increases.

The slewing motor 20 is a hydraulic motor which operates to slew the upper slewing body 12 by receiving a supply of the hydraulic fluid. The slewing motor 20 has an unillustrated output shaft which rotates by receiving a supply of the hydraulic fluid. The output shaft is connected to the upper slewing body 12 for slewing the upper slewing body 12 in left and right directions. Specifically, the slewing motor 20 has a pair of ports. One of the ports is aimed at receiving a supply of the hydraulic fluid so that the output shaft rotates in a direction corresponding to the one of the ports, and the other of the ports is aimed at discharging the hydraulic fluid therefrom.

As shown in FIG. 2, the manipulation devices include a boom manipulation device 61, an arm manipulation device 62, a bucket manipulation device 63, and a slewing manipulation device 64. The manipulation devices 61 to 64 respectively have manipulation levers 61A to 64A for each receiving a manipulation by the operator. Each of the manipulation devices may be constituted by a hydraulic manipulation device or an electric manipulation device. One manipulation lever may serve as a plurality of manipulation levers. For instance, a right manipulation lever located in front of the seat, which allows the operator to sit thereon, at a right position thereof may serve as a boom lever when manipulated in a front-rear direction, and serve as a bucket lever when manipulated in a left-right direction. Similarly, a left manipulation lever located in front of the seat at a left position thereof may serve as an arm lever when manipulated in the front-rear direction and serve as a slewing lever when manipulated in the left-right direction. Such lever patterns may be appropriately changed in response to a manipulation instruction from the operator. FIG. 2 shows a circuit configuration for the manipulation devices 61 to 64 each constituted by the electric manipulation device.

The control valves include a boom control valve 41, an arm control valve 42, a bucket control valve 43, a slewing control valve 44, a pair of boom proportional solenoid valves 45, a pair of arm proportional solenoid valves 46, a pair of bucket proportional solenoid valves 47, and a pair of slewing proportional solenoid valves 48.

For example, when the manipulation lever 63A of the bucket manipulation device 63 is manipulated, information about a manipulation amount and a manipulation direction of the manipulation lever 63A is converted to an electric signal (manipulation signal) and the manipulation signal is input to the controller 50. The controller 50 inputs an instruction signal (instruction current) corresponding to the manipulation signal to either of the bucket proportional solenoid valves 47 that corresponds to the manipulation direction of the manipulative lever 63A. The corresponding bucket proportional solenoid valve 47 reduces a pressure of a pilot oil discharged from the pilot pump 22 in response to the instruction signal, and supplies the reduced pilot pressure to either of the pair of pilot ports of the bucket control valve 43. Accordingly, the bucket control valve 43 opens in a direction corresponding to the pilot port to which the pilot pressure is input at a stroke corresponding to the pilot pressure. This results in permitting the hydraulic fluid discharged from the hydraulic pump 21 to flow into a head chamber or a rod chamber of the bucket cylinder 19 at a flow rate corresponding to the stroke. Each of the manipulation levers of the remaining manipulation devices 61, 62, 64 is manipulated in the same manner as the case described above, and thus description therefor will be omitted.

Although a hydraulic circuit for each manipulation device of a hydraulic type is unillustrated here, such a hydraulic circuit included in the hydraulic excavator 10 acts as described below. For example, when the manipulation lever 63A of the bucket manipulation device 63 is manipulated, a pilot primary pressure from the pilot pump 22 is reduced by a remote-control valve of the bucket manipulation device 63 depending on the manipulation amount of the manipulation lever 63A, and the reduced pilot pressure is output from the remote-control valve. The output pilot pressure is input to either of the pair of pilot ports of the bucket control valve 43. Accordingly, the bucket control valve 43 opens in a direction corresponding to the pilot port to which the pilot pressure is input at a stroke corresponding to the pilot pressure. This results in permitting the hydraulic fluid discharged from the hydraulic pump 21 to flow into a head chamber or a rod chamber of the bucket cylinder 19 at a flow rate corresponding to the stroke.

As shown in FIG. 2, the pressure sensors include a pressure sensor 35 which detects a head pressure of the boom cylinder 17 and a pressure sensor 36 which detects a rod pressure of the boom cylinder 17

The posture detection part includes a boom posture detector 31 which can detect posture information on the boom 14, an arm posture detector 32 which can detect posture information on the arm 15, and a bucket posture detector 33 which can detect posture information on the bucket 16. In the embodiment, each of the posture detectors 31, 32, 33 is composed of, for example, an Inertial Measurement Unit (IMU).

The posture detection part may include a stroke sensor, may include an angle sensor, or may include a position detector utilizing a satellite positioning system. Specifically, a posture of the boom 14, a posture of the arm 15, and a posture of the bucket 16 may be calculated, for example, based on a stroke value of a stroke of each of the boom cylinder 17, the arm cylinder 18, and the bucket cylinder 19 as detected by the stroke sensor. The posture of the boom 14, the posture of the arm 15, and the posture of the bucket 16 may be calculated, for example, based on an angle value obtained by the angle sensor provided to each of a rotary shaft at the proximal end of the boom 14, a rotary shaft at the proximal end of the arm 15, and a rotary shaft at the proximal end of the bucket 16. The posture of the boom 14, the posture of the arm 15, and the posture of the bucket 16 may be calculated, for example, based on a detection value obtained by the position detector utilizing the satellite positioning system, e.g., a GNSS sensor.

The posture information (posture signal) about each of the posture of the boom 14, the posture of the arm 15, and the posture of the bucket 16 detected by the posture detection part in the manner described above is input to the controller 50.

The controller 50 (mechatronic controller) is composed of a computer including, for example, a CPU, a memory, and other elements, and operably has a manipulation determination part 51, a posture calculation part 52, a speed calculation part 53, a load calculation part 54, an estimative load determination part 55, an estimative load update part 56, a definitive load determination part 57, and a load information output part 58.

The manipulation determination part 51 determines whether a manipulation is given to the manipulation lever of each of the manipulation devices 61 to 64. In the case where each of the manipulation devices 61 to 64 is constituted by the electric manipulation device as shown in FIG. 2, each of the manipulation devices 61 to 64 inputs, to the controller 50, a manipulation signal corresponding to a manipulation amount given to the corresponding manipulation lever and a manipulation direction. The manipulation determination part 51 can determine that a manipulation is given to a certain manipulation lever of the corresponding manipulation device, specifically, can determine the manipulation amount given to the manipulation lever and the manipulation direction, in response to the input manipulation signal.

Specifically, in the embodiment, the manipulation determination part 51 can determine that: a boom raising manipulation of extending the boom cylinder 17 or a boom lowering manipulation of contracting the boom cylinder 17 is given to the manipulation lever 61A of the boom manipulation device 61; an arm pulling manipulation of extending the arm cylinder 18 or an arm pushing manipulation of contracting the arm cylinder 18 is given to the manipulation lever 62A of the arm manipulation device 62; a bucket pulling manipulation of extending the bucket cylinder 19 and a bucket pushing manipulation of contracting the bucket cylinder 19 are given to the manipulation lever 63A of the bucket manipulation device 63; and a right slewing manipulation or a left slewing manipulation of slewing the upper slewing body 12 is given to the manipulation lever 64A of the slewing manipulation device 64. In the case of the manipulation devices 61 to 64 each constituted by the electric manipulation device, the manipulation determination part 51 forms a manipulation detection part which can detect a manipulation given to each of the manipulation levers 61A to 64A of the manipulation devices 61 to 64.

In the case where each of the manipulation devices 61 to 64 is constituted by the hydraulic manipulation device, the hydraulic excavator 10 includes a plurality of unillustrated pilot pressure sensors each detecting a pilot pressure output from the remote-control valve depending on a manipulation amount given to the corresponding manipulation lever of each of the manipulation devices 61 to 64. Each of the pilot pressure sensors inputs, to the controller 50, a manipulation signal corresponding to the detected pilot pressure. The manipulation determination part 51 can determine that a manipulation is given to a certain manipulation lever of the corresponding manipulation device, specifically, can determine the manipulation amount given to the manipulation lever and the manipulation direction, in response to the input manipulation signal. In the case of the manipulation devices 61 to 64 each constituted by the hydraulic manipulation device, the pilot pressure sensors and the manipulation determination part 51 form a manipulation detection part which can detect a manipulation given to each of the manipulation levers 61A to 64A of the manipulation devices 61 to 64.

The posture calculation part 52 calculates each of the posture of the boom 14, the posture of the arm 15, and the posture of the bucket 16 in response to the posture signal input from the posture detection part. The posture calculation part 52 may calculate, for example, a boom angle $\theta 1$, an arm angle $\theta 2$, a bucket angle $\theta 3$ shown in FIG. 1 respectively as the posture of the boom 14, the posture of the arm 15, and the posture of the bucket 16 in response to the posture signal.

For instance, the boom angle $\theta 1$ may be defined between a straight line 14a representing the direction of the boom 14 and a plane P perpendicularly intersecting a slewing central axis C of the upper slewing body 12. The arm angle $\theta 2$ may be defined between the straight line 15a representing the direction of the arm 15 and the straight line 14a. The bucket angle $\theta 3$ may be defined between the straight line 16a representing the direction of the bucket 16 and the straight line 15a. The straight line 14a may connect the rotary shaft at the proximal end of the boom 14 and a rotary shaft at the distal end of the boom 14 (the rotary shaft at the proximal end of the arm 15) to each other. The straight line 15a may connect the rotary shaft at the proximal end of the arm 15 and a rotary shaft at the distal end of the arm 15 (the rotary shaft at the proximal end of the bucket 16) to each other. The straight line 16*a* may connect the rotary shaft at the proximal end of the bucket 16 and a distal end 16E of the bucket 16.

The speed calculation part 53 calculates a boom rising speed at which the boom 14 rises in the rising direction. The speed calculation part 53 may calculate, based on a plurality of boom angles θ1 periodically acquired, the boom rising speed (angle speed) by dividing a change amount in the boom angles θ1 by a changed time. Moreover, when the boom posture detector 31 is composed of the stroke sensor, the speed calculation part 53 may calculate, based on a plurality of stroke values of the boom cylinder 17 periodically acquired, an extension speed of the boom cylinder 17 by dividing a change amount in the stroke values by a changed time, and may calculate, based on the calculated extension speed, the boom rising speed.

For instance, the load calculation part 54 calculates a load of the object held by the bucket 16 in the manner which will be described below. A way of calculating the load of the object is not limited to the following calculation way, and another known way is adoptable to calculate the load.

In the embodiment, the load calculation part 54 calculates the load of the object held by the bucket 16 by using the following Equation 1.

$$M = M1 + M2 + M3 + W \times L \quad (1)$$

In Equation (1), the sign "M" denotes a moment of the boom cylinder 17 around a boom foot pin. The sign "M1" denotes a moment of the boom 14 around a boom foot pin. The sign "M2" denotes a moment of the arm 15 around a boom foot pin. The sign "M3" denotes a moment of the bucket 16 around a boom foot pin. The sign "W" denotes a load of an object, such as soil and sand, held by the bucket 16. The sign "L" denotes a horizontal distance from the boom foot pin to the proximal end of the bucket 16.

The moment M is calculated from the head pressure and the rod pressure of the boom cylinder 17. The moment M1 is calculated by a product of a distance between a gravity center of the boom 14 and the boom foot pin, and a weight of the boom 14. The moment M2 is calculated by a product of a distance between a gravity center of the arm 15 and the boom foot pin, and a weight of the arm 15. The moment M3 is calculated by a product of a distance between a gravity center of the bucket 16 and the boom foot pin, and a weight of the bucket.

A position of the gravity center of the boom 14, a position of the gravity center of the arm 15, and a position of the gravity center of the bucket 16 are calculated, based on information about the posture of the working device 13 detected by the posture detection part. The head pressure of the boom cylinder 17 is detected by the pressure sensor 35, and the rod pressure of the boom cylinder 17 is detected by the pressure sensor 36. The horizontal distance L is calculated, based on the information about the posture of the working device 13 detected by the posture detection part.

In the embodiment, the posture detection part, the pressure sensors 35, 36, the posture calculation part 52, and the load calculation part 54 form a load acquisition section which acquires the load of the object held by the bucket 16.

The estimative load determination part 55 determines, based on the load acquired by the load acquisition section, an estimative load of the object estimated to be discharged at the position above the destination in the discharge task when a predetermined estimative load determinative criterion is satisfied.

The estimative load determinative criterion includes a criterion (boom rising speed reduction criterion) that the boom rising speed reduces in the carrying task. The estimative load determination part 55 can determine whether the boom rising speed reduction criterion is satisfied, for example, in a manner described below.

In the carrying task, when a restoring manipulation signal indicating that a restoring manipulation is given to the manipulation lever 61A of the boom manipulation device 61 is input to the controller 50, the manipulation determination part 51 determines that the restoring manipulation is performed, and the estimative load determination part 55 determines that, based on the determination by the manipulation determination part 51, the boom rising speed reduction criterion forming the estimative load determinative criterion is satisfied. Hereinafter, more details will be described.

In the carrying task to be performed after a completion of the holding task, the operator gives, to the manipulation lever 61A of the boom manipulation device 61, a boom raising manipulation of tilting the manipulation lever 61A in a predetermined direction from a neutral position to hold the manipulation lever 61A at a specific position (e.g., at a full lever position) in the state where the manipulation lever 61A tilts for a boom raising operation. The operator then performs the restoring manipulation of restoring the manipulation lever 61A from the specific position toward the neutral position after confirming that the bucket 16 has approached a target position above the dump truck (destination). Consequently, the boom rising speed starts to reduce. The restoring manipulation signal is an exemplary speed reduction determinative signal for determining a reduction in the boom rising speed in the carrying task.

In the case of the boom manipulation device 61 constituted by the electric manipulation device, the restoring manipulation signal represents the manipulation signal input from the boom manipulation device 61 to the controller 50 when the restoring manipulation is given to the manipulation lever 61A of the boom manipulation device 61. In the case of the boom manipulation device 61 constituted by the hydraulic manipulation device, the restoring manipulation signal represents the manipulation signal input from the pilot pressure sensor to the controller 50 (manipulation signal corresponding to the pilot pressure detected by the pilot pressure sensor) when the restoring manipulation is given to the manipulation lever 61A of the boom manipulation device 61.

Moreover, the estimative load determination part 55 can determine that the boom rising speed reduction criterion is satisfied when determining that the boom rising speed starts to reduce in the carrying task. Specifically, the estimative load determination part 55 can determine that, based on the boom rising speed (speed signal) periodically calculated by the speed calculation part 53, the boom rising speed starts to reduce, that is, an acceleration of the boom raising operation changes to a minus value. The speed signal is an exemplary speed reduction determinative signal for determining a reduction in the boom rising speed in the carrying task.

The determination of the estimative load is triggered by determination made by the estimative load determination part 55 that the boom rising speed reduction criterion is satisfied.

Specifically, when determining that the estimative load determinative criterion (boom rising speed reduction criterion) is satisfied, for example, the estimative load determination part 55 may determine, based on the determination, the load of the object (load of the object held by the bucket 16) acquired by the load acquisition section as the estimative load. Moreover, for instance, the estimative load determination part 55 may determine, as the estimative load, a load acquired and stored after the completion of the holding task when determining that the estimative load determinative criterion (boom rising speed reduction criterion) is satisfied. In a case where a plurality of loads is acquired and stored after the completion of the holding task, an average value of the loads may be determined as the estimative load, for example.

The estimative load update part 56 updates, based on the load acquired by the load acquisition section after the estimative load is determined, the estimative load.

The definitive load determination part 57 determines, when a predetermined definitive load determinative criterion for determining a definitive load is satisfied, the estimative load as the definitive load of the object. The definitive load is defined as a load of the object to be actually discharged at the position above the destination in the discharge task.

The estimative load update part 56 updates the estimative load when the definitive load determinative criterion is not satisfied and the predetermined estimative load update criterion is satisfied.

The estimative load update criterion includes: a criterion (reduction manipulation criterion) that a predetermined first reduction manipulation of reducing an amount of the object held by the bucket 16 is performed; and a time criterion.

In the embodiment, each of the bucket pushing manipulation and the arm pushing manipulation is set as the first reduction manipulation in advance. The bucket pushing manipulation exemplifies an attachment discharge manipulation. Each of the bucket pushing manipulation and the arm pushing manipulation can correspond to a manipulation for executing a discharge amount adjustment and a manipulation for performing the discharge task. The discharge amount adjustment includes reducing an amount of soil and sand (object) held by the bucket 16 by discharging, from the bucket 16, a portion of the soil and sand held by the bucket 16, and adjusting the amount (discharge amount) of the object to be discharged at the position above the dump truck after the holding task. Here, only one of the bucket pushing manipulation and the arm pushing manipulation may be set as the first reduction manipulation without the other of the manipulations.

The estimative load update part 56 can determine whether the reduction manipulation criterion is satisfied, for example, in a manner described below. When at least one of manipulation signals, i.e., a manipulation signal (bucket pushing manipulation signal) indicating that the bucket pushing manipulation is given to the manipulation lever 63A of the bucket manipulation device 63 and a manipulation signal (arm pushing manipulation signal) indicating that the arm pushing manipulation is given to the manipulation lever 62A of the arm manipulation device 62, is input to the controller 50, the manipulation determination part 51 determines that the first reduction manipulation is performed, and the estimative load update part 56 determines that the reduction manipulation criterion is satisfied.

The time criterion may be, for example, a criterion that a time from a completion of the first reduction manipulation to a start of a second reduction manipulation is equal to or longer than a predetermined time threshold.

The second reduction manipulation is an manipulation set in advance, the second reduction manipulation being performed for reducing the amount of the object held by the bucket 16 after the completion of the first reduction manipulation. In the embodiment, the second reduction manipulation is the same as the first reduction manipulation. Specifically, each of the bucket pushing manipulation and the arm pushing manipulation is set as the second reduction manipulation in advance. Here, only one of the bucket pushing manipulation and the arm pushing manipulation may be set as the second reduction manipulation without the other of the manipulations.

In this embodiment, the estimative load update part 56 determines whether to update the estimative load, based on an elapsed time from the completion of the first reduction manipulation to the start of the second reduction manipulation. Specifically, when the elapsed time is equal to or longer than the time threshold, the first reduction manipulation and the second reduction manipulation are intermittent or discontinuous, and thus the first reduction manipulation can be considered as a manipulation for executing the discharge amount adjustment. In this case, updating of the estimative load is necessary. Hence, the estimative load update part 56 updates the estimative load when the estimative load update criterion including the criterion that the elapsed time is equal to or longer than the time threshold is satisfied. In contrast, when the elapsed time is shorter than the time threshold, the first reduction manipulation and the second reduction manipulation are considered as a series of manipulations. In this case, updating of the estimative load accompanied by the first reduction manipulation is not necessary. Accordingly, the estimative load update part 56 avoids updating the estimative load when the elapsed time does not satisfy the criterion that the elapsed time is equal to or longer than the time threshold.

The estimative load update part 56 is operative to measure an elapsed time from the completion of the first reduction manipulation to the start of the second reduction manipulation.

After the estimative load is determined, the estimative load update part 56 updates the estimative load when the manipulation determination part 51 determines at least one of facts that the bucket pushing manipulation is given to the manipulation lever 63A and that the arm pushing manipulation is given to the manipulation lever 62A, and when the time from the completion of the first reduction manipulation to the start of the second reduction manipulation is equal to or longer than the predetermined time threshold.

The updating of the estimative load is performed, based on the load acquired by the load acquisition section after the estimative load is determined.

Specifically, for example, after the estimative load is determined, the estimative load update part 56 may update the estimative load, when the definitive load determinative criterion is not satisfied and the estimative load update criterion is satisfied, by revising the estimative load to a load of the object (load of the object held by the bucket 16) acquired by the load acquisition section. Alternatively, after the estimative load is determined, the estimative load update part 56 may update the estimative load by revising the estimative load, for example, to the load acquired and stored after the determination of the estimative load, when the definitive load determinative criterion is not satisfied and the estimative load update criterion is satisfied. In a case where a plurality of loads is acquired and stored after the determination of the estimative load, the estimative load may be updated by revising the estimative load to an average value of the plurality of loads, for example.

The definitive load determinative criterion includes a criterion that the load acquired by the load acquisition section after the estimative load is determined is equal to or smaller than a predetermined load threshold. The load threshold may be set to, for example, a value larger than zero. Specifically, a large portion of the soil and sand held by the bucket 16 drops from the bucket 16 to the dump truck in response to the bucket pushing manipulation in the discharge task (soil discharge task), but some of the soil and sand adhered to the bucket may occasionally remain at the bucket. The load threshold is set to a value larger than zero so that the definitive load determination part 57 can definitively determine the estimative load as the load of the object even in this occasion. The load threshold may be set to, for example, the value larger than zero in further consideration of the accuracy of the load acquired by the load acquisition section.

After the estimative load is determined, the definitive load determination part 57 determines the estimative load determined by the estimative load determination part 55 as the definitive load of the object at a time when the definitive load determinative criterion is satisfied before the estimative load is updated. In contrast, after the estimative load is determined, the definitive load determination part 57 determines the estimative load updated by the estimative load update part 56 as the definitive load of the object at a time when the definitive load determinative criterion is satisfied after the estimative load is updated. When the updating of the estimative load is repeated a plurality of times, the definitive load determination part 57 determines the latest estimative load updated by the estimative load update part 56 as the definitive load of the object.

The load information output part 58 outputs information about the determined definitive load to the display device 70. The load information output part 58 may output, for example, the load of the soil and sand (object) held by the bucket 16 in the holding task in addition to the information about the definitive load in real time. The load information output part 58 may output, in the loading work, a cumulative value of the load of the soil and sand discharged to the dump truck, a target loading amount of the soil and sand to be discharged to the dump truck, and the number of times of the soil discharging to the dump truck.

The display device 70 may be arranged visibly by the operator in the cab 12C of the hydraulic excavator 10. The display device 70 displaying the various kinds of information allows the operator to grasp, in real time, a difference (remaining dischargeable amount of the object) from a target loading amount (loading target) to the dump truck at the time of displaying, and grasp the load of the soil and sand (object) held by the bucket 16 at the time of the displaying. When the amount of the load of the soil and sand (object) held by the bucket 16 is larger than the dischargeable remaining amount, the operator manipulates a specific manipulation lever of the corresponding manipulation device for the discharge amount adjustment to thereby drop a portion of the object from the bucket 16 and adjust the load of the object held by the bucket 16. Thereafter, the operator can load the soil and sand (object) in an amount closer to the target loading amount to the dump truck in the discharge task.

The display device 70 may include a display for a personal computer or a mobile information terminal device located in a place different from the hydraulic excavator 10.

Figure 3:
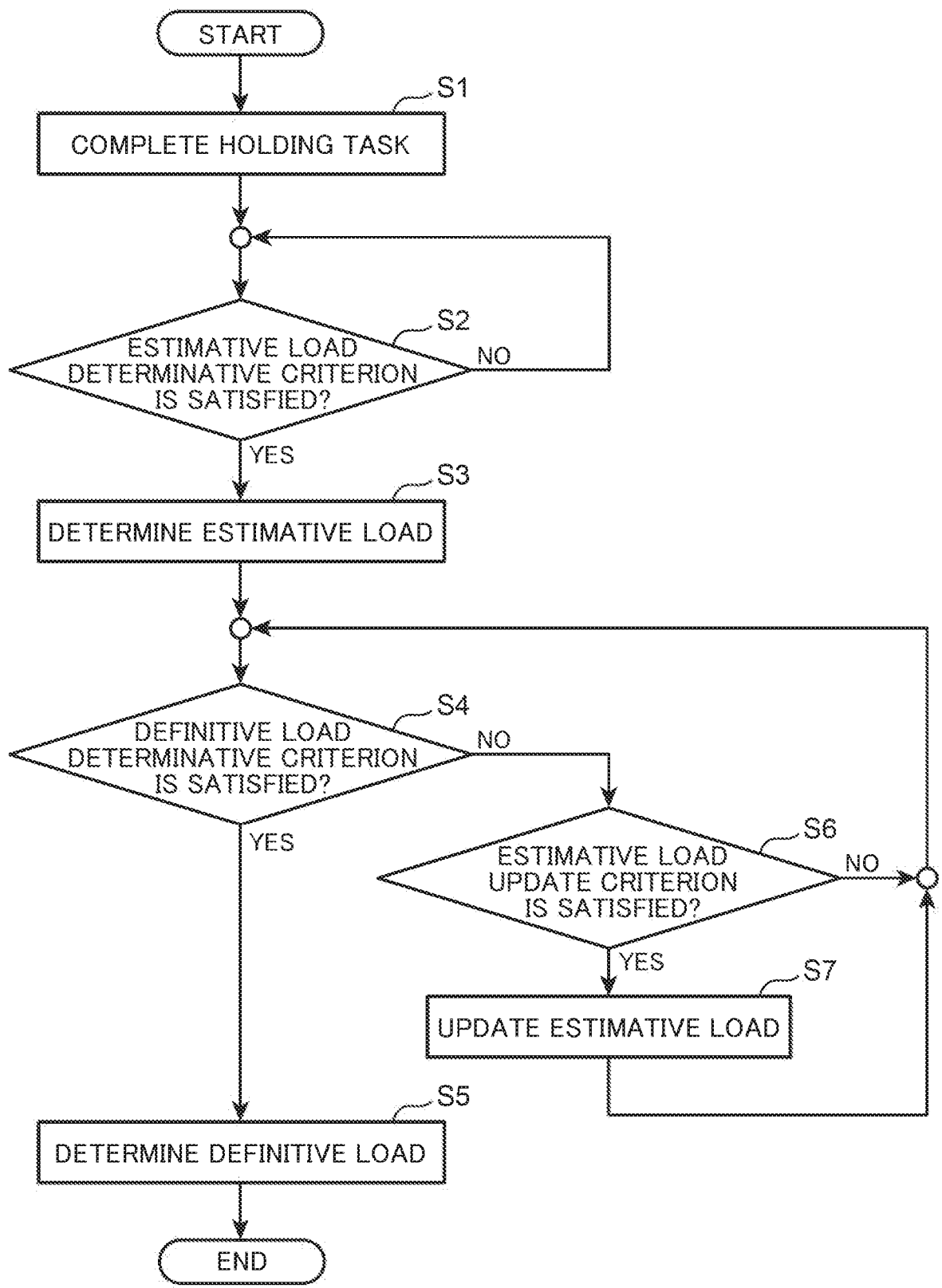
FIG. 3 is a flowchart showing a control operation to be executed by the controller.

FIG. 3 is a flowchart showing a control operation to be executed by the controller 50.

The controller 50 executes the control operation including steps S2 to S7 shown in FIG. 3 in response to an input of a signal indicating a completion of the holding task in the loading work to the controller 50 (step S1). The signal indicating the completion of the holding task can cover various aspects depending on a specific content of the holding task, and thus is not particularly limited and covers the following specific examples.

In the embodiment, the loading work includes the holding task (excavation task), the carrying task, and the discharge task (soil discharge task). The holding task includes excavating soil and sand, and holding the excavated soil and sand by the bucket 16. In the holding task, the operator performs the boom raising manipulation, the arm pulling manipulation, and the bucket pulling manipulation while avoiding the slewing manipulation of slewing the upper slewing body 12. The carrying task to be performed subsequently to the holding task includes moving the bucket 16 holding the soil and sand toward a higher position than the dump truck thereabove while slewing the upper slewing body 12, for example, at an angle of around 90° in a plan view so that the bucket 16 reaches right above the dump truck. Thus, the operator performs the slewing manipulation at a start of the carrying task. In this case, the controller 50 receives an input of a manipulation signal (slewing manipulation signal) indicating a manipulation of the manipulation lever 64A of the slewing manipulation device 64, the manipulation determination part 51 determines that the slewing manipulation is performed, and then the controller 50 determines that the holding task is completed (step S1).

When the holding task (excavation task) is performed, the bucket 16 holds the excavated soil and sand. Thus, a load acquired by the load acquisition section is larger than the load before a start of the holding task. Accordingly, the controller 50 may determine that the holding task is completed when the load acquired by the load acquisition section is equal to or larger than a predetermined threshold (holding task completion determinative threshold) (step S1).

Figure 4:
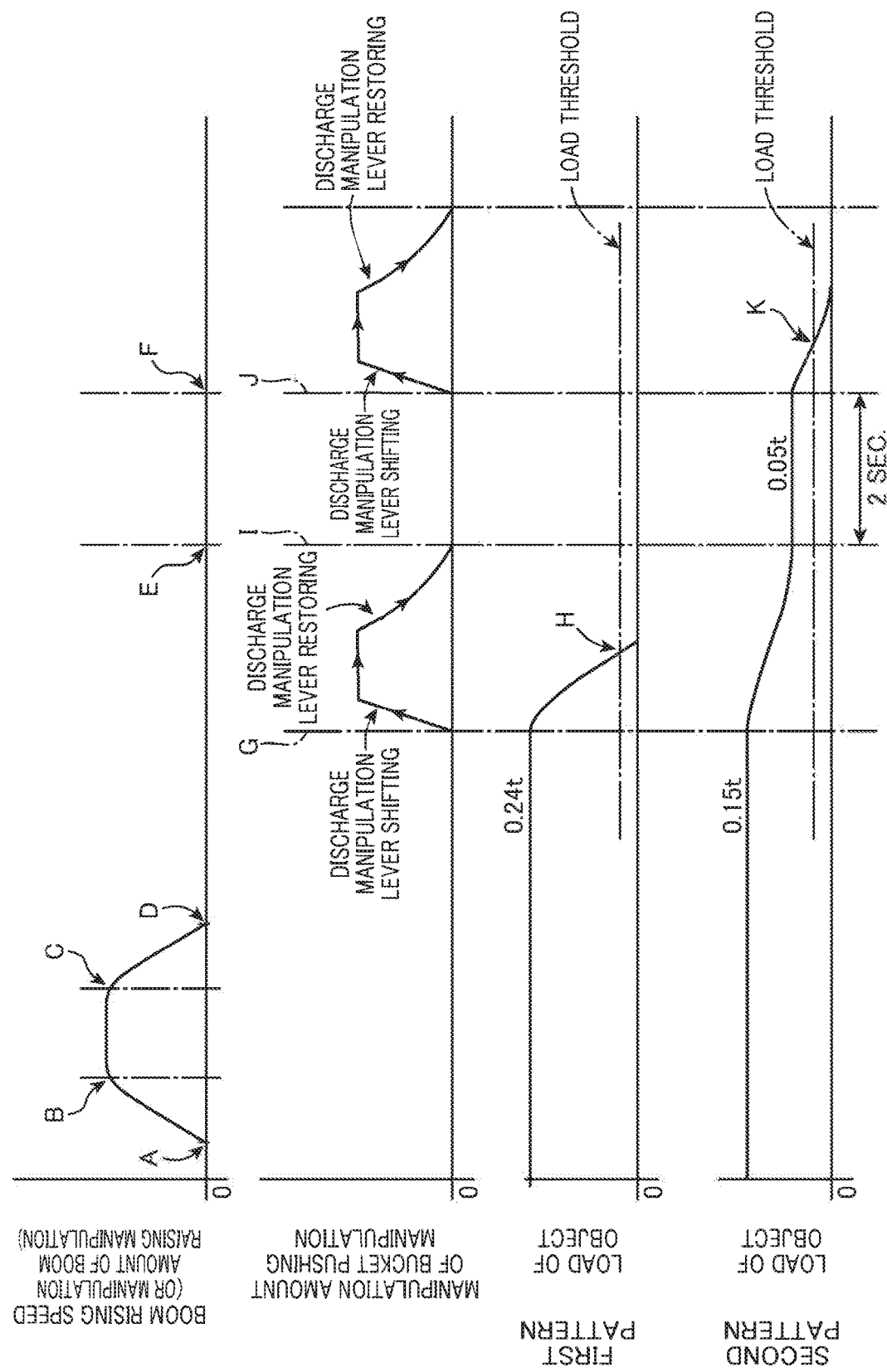
FIG. 4 is a graph showing an exemplary chronological change in each of a boom rising speed, a manipulation amount (manipulation signal) of a bucket pushing manipulation, and a load of soil and sand held by a bucket in the control operation.

FIG. 4 is a graph showing an exemplary chronological change in each of the boom rising speed, the manipulation amount (manipulation signal) of the bucket pushing manipulation, and the load of the soil and sand (object) held by the bucket 16 in the control operation shown in FIG. 3. FIG. 4 shows four pieces of data along their respective time axes (horizontal axes) arranged in the same manner.

The first data in FIG. 4 shows a chronological change in the boom rising speed, i.e., the speed for the boom raising operation. The boom rising speed is calculated by the speed calculation part 53 in the above-described manner. A tendency in the chronological change in the boom rising speed substantially match a tendency in the chronological change in the manipulation amount of the boom raising manipulation given to the manipulation lever 61A of the boom manipulation device 61. The first data in FIG. 4 may show a chronological change in the manipulation amount of the boom raising manipulation given to the manipulation lever 61A of the boom manipulation device 61.

In the carrying task to be performed after the completion of the holding task, the operator gives, to the manipulation lever 61A of the boom manipulation device 61, a boom raising manipulation of tilting the manipulation lever 61A in a predetermined direction from the neutral position (at a time point denoted by point A in FIG. 4) to hold the manipulation lever 61A at a specific position (e.g., at a full lever position) in the state where the manipulation lever 61A tilts for a boom raising operation. In this way, the boom rising speed gradually increases and is maintained at a substantially specific value after the speed reaches a maximum speed (at a time point denoted by point B in FIG. 4). Although unillustrated, the operator gives, to the manipulation lever 64A of the slewing manipulation device 64, a slewing manipulation of tilting the manipulation lever 64A in a predetermined direction from the neutral direction so that the boom raising operation and a slewing operation are performed simultaneously, and holds the manipulation lever 64A in the tilting state at a specific position (e.g., full lever position), if necessary.

The operator then performs the restoring manipulation of restoring the manipulation lever 61A of the boom manipulation device 61 from the specific position toward the neutral position (at a time point denoted by point C) after confirming that the bucket 16 has approached the target position above the dump truck (destination). Consequently, the boom rising speed starts to reduce. The restoring manipulation may be, for example, a manipulation of continuously shifting the manipulation lever 61A back to the neutral position from the specific position. Alternatively, the restoring manipulation may be, for example, a manipulation of shifting the manipulation lever 61A from the specific position to a half lever position (between the specific position and the neutral position) and hold the lever in this state at the half lever position, and thereafter shifting the lever from the half lever position back to the neutral position. The operator performs a restoring manipulation of restoring the manipulation lever 64A of the slewing manipulation device 64 from a specific position toward a neutral position as well, if necessary. The restoring manipulation of each of the manipulation levers 61A, 64A results in stopping each of the boom raising operation and the slewing operation (at a time point denoted by point D in FIG. 4).

In the embodiment, the estimative load determination part 55 determines the estimative load when the reduction in the boom rising speed is started and the estimative load determinative criterion is satisfied at the time point denoted by the point C in FIG. 4.

At the time point (stop time point) denoted by the point D in FIG. 4, the bucket 16 holding the soil and sand may be located right above the dump truck, i.e., located to overlap the dump truck in a plan view, or may be located to deviate from the dump truck in the plan view.

More specifically, when an operation (first pattern operation) shown in a third data in FIG. 4 to be described later is performed, the bucket 16 is located right above the dump track, i.e., located to overlap the dump truck in the plan view. When the first pattern operation is performed, the carrying task is completed at the time point denoted by the point D in FIG. 4.

In contrast, an operation (second pattern operation) shown in a fourth data in FIG. 4 to be described later is performed, the bucket 16 is located to deviate from the dump truck in the plan view. When the second pattern operation is performed, a former half of the carrying task is completed at the time point denoted by the point D in FIG. 4, and a latter half of the carrying task is performed in a time from point E to point F in the first graph in FIG. 4. For instance, the latter half of the carrying task may include only the slewing operation, or may include the boom raising operation and the slewing operation in combination. The latter half of the carrying task is performed to cause the bucket 16 to reach right above the dump truck, i.e., to be located to overlap the dump truck in the plan view.

A second data in FIG. 4 shows a chronological change in a manipulation signal (bucket pushing manipulation signal) of the bucket pushing manipulation given to the manipulation lever 63A of the bucket manipulation device 63 among the manipulation signals input to the controller 50. The bucket pushing manipulation is set as both the first reduction manipulation and the second reduction manipulation.

The third data in FIG. 4 shows the first pattern operation. As shown in the third data, after a completion of the carrying task, the bucket pushing manipulation is given to the manipulation lever 63A (at a time point denoted by time G in FIG. 4). Consequently, the definitive load determinative criterion is satisfied (at a time point denoted by point H in FIG. 4) before the estimative load is updated, then the definitive load is determined.

The fourth data in FIG. 4 shows the second pattern operation. As shown in the fourth data, after the former half of the carrying task in the time from the point A to the point D in FIG. 4 is performed, the bucket pushing manipulation (first reduction manipulation) is given to the manipulation lever 63A at the time point denoted by the time G in FIG. 4. Consequently, the discharge amount adjustment is executed. In the discharge amount adjustment, a portion of the soil and sand held by the bucket 16 drops from the bucket 16, and the amount of the soil and sand held by the bucket 16 reduces.

Thereafter, the latter half of the carrying task is performed in the time from the point E to the point F in FIG. 4. Then, the bucket pushing manipulation (second reduction manipulation) is further given to the manipulation lever 63A at a time point denoted by time J in FIG. 4. Consequently, the discharge task is performed. In the discharge task, a large portion of the soil and sand held by the bucket 16 drops from the bucket 16, and the load held by the bucket 16 is equal to or smaller than the load threshold at a time point denoted by point K in FIG. 4.

In the embodiment, the estimative load update part 56 updates the estimative load when the definitive load determinative criterion is not satisfied and the estimative load update criterion is satisfied at the time point denoted by the time J in FIG. 4. The definitive load is determined when the definitive load determinative criterion is satisfied (at the time point denoted by the point K in FIG. 4) after the estimative load is updated.

Figure 5:
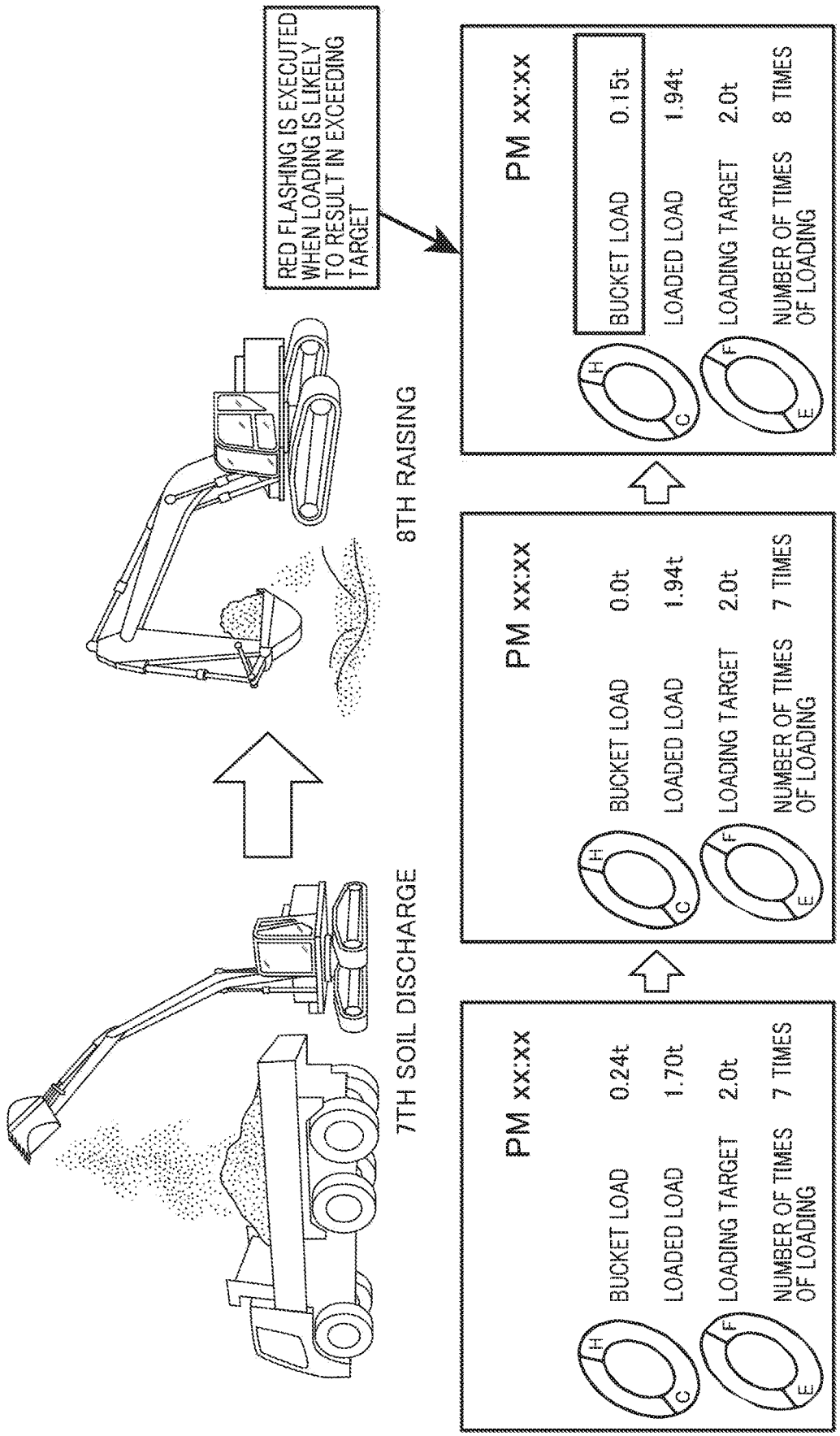
FIG. 5 is a view showing an example of a loading work of soil and sand as performed by the hydraulic excavator and an example of contents displayed on a display device through the control operation.
Figure 6:
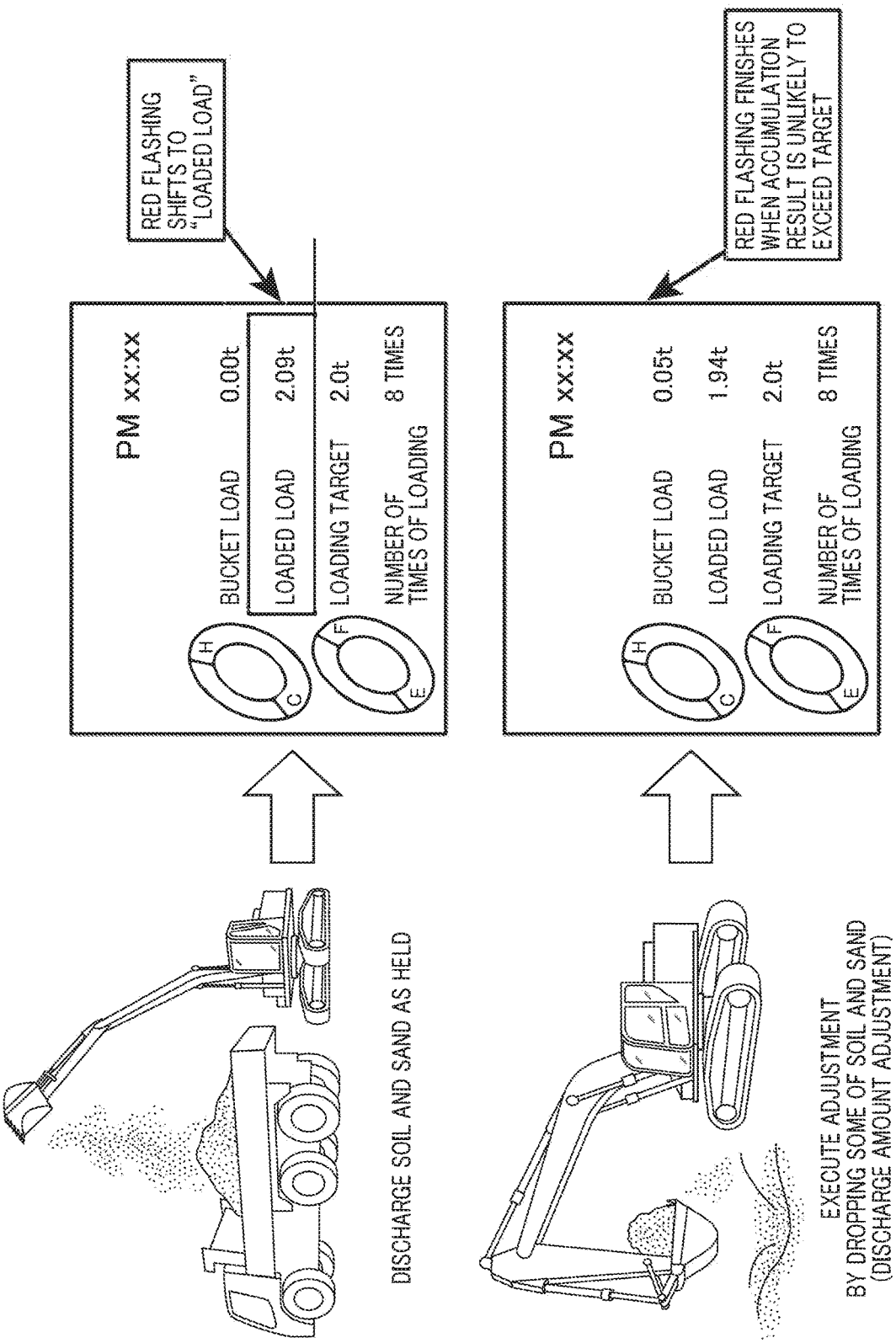
FIG. 6 is a view showing another example of the loading work of soil and sand as performed by the hydraulic excavator and another example of contents displayed on the display device through the control operation.

In a typical sitework, a total load value of the object to be discharged (soil and sand to be discharged) at the position above the dump truck reaches a target loading amount to the dump truck by repeating the loading work a plurality of times. Each of FIG. 5 and FIG. 6 shows an example of the loading work of the soil and sand as performed by the hydraulic excavator 10 and an example of contents displayed on the display device 70 by the control operation. Each of FIG. 5 and FIG. 6 further shows an exemplary case where a total load value ("loaded load" in FIG. 5) of the object reaches a target loading amount ("loading target" in FIG. 5) of 2.0 t under the condition that the loading work has been performed seven times heretofore, and that a discharge task (soil discharge task) in the subsequent eighth loading work will be performed.

Specific display contents displayed on the display device 70 shown in each of FIG. 5 and FIG. 6 will be described below. The item "bucket load" represents a load of an object, such as soil and sand, held by the bucket 16 to be calculated by the load calculation part 54. The item "loaded load" represents a total load value of the object loaded to a destination, such as the dump truck. FIG. 5 shows that the object of 1.94 t has been loaded to the destination in the discharge task (soil discharge task) heretofore. The item "loading target" represents a target amount of the object to be loaded to the destination, such as the dump truck. The item "number of times of loading" represents the number of times of the discharge task (soil discharge task) performed at the destination, such as the dump truck. The item "bucket load" is prominently displayed in the right section in FIG. 5. The prominent displaying aims at notifying that loading of the soil and sand (the "bucket load" of 0.15 t) held by the bucket 16 at the destination, such as the dump truck, in a subsequent loading work (the eighth loading work) would exceed the loading target in the situation of the "loaded load" of 1.94 t at the completion of the seventh loading work. Conversely, the prominent displaying is finished when the discharge amount adjustment is executed and the excess state is solved as shown in the lower section in FIG. 6. Furthermore, when the "loaded load" exceeds the "loading target", the item "loaded load" may be prominently displayed as shown in FIG. 6. The prominent displaying may include changing the display of the item in an appealing color, e.g., by flashing the item in red. Alternatively, the excess of load may be notified by a warning sound simultaneously, or by a guidance, such as a voice guidance.

Accordingly, in the first to seventh loading works, the operator determines, based on information, i.e., information without the prominent displaying, displayed on the display device 70, no necessity of the discharge amount adjustment, and thus performs the manipulation for performing the first pattern operation shown in the third data in FIG. 4. The first pattern operation will be described with reference to the flowchart in FIG. 3 and the graph in FIG. 4 again.

The estimative load determination part 55 of the controller 50 determines whether the estimative load determinative criterion is satisfied (step S2). At the time point denoted by the point C in FIG. 4, the estimative load determination part 55 determines that the estimative load determinative criterion is satisfied (YES in step S2) in response to an input of a speed signal indicating that the reduction in the boom rising speed is started in the carrying task or a restoring manipulation signal indicating that the restoring manipulation is given to the manipulation lever 61A of the boom manipulation device 61 in the carrying task to the controller 50, and further determines, for example, the load held by the bucket 16 and acquired by the load acquisition section at the time point as an estimative load (step S3). The estimative load is determined to 0.24 t in the specific example shown in each of FIG. 4 to FIG. 6.

Subsequently, the definitive load determination part 57 determines whether the definitive load determinative criterion is satisfied (step S4). After the estimative load is determined, the discharge task is performed in response to the bucket pushing manipulation given to the manipulation lever 63A at the time point denoted by the time G in the third data in FIG. 4. Consequently, the definitive load determination part 57 determines that the definitive load determinative criterion is satisfied (YES in step S4) when the load acquired by the load acquisition section is equal to or smaller than the load threshold at the time point denoted by the point H in FIG. 4, and further determines the estimative load as a definitive load (step S5). The definitive load is determined to 0.24 t in the specific example shown in each of FIG. 4 to FIG. 6.

Then, in the eighth loading work, the operator determines, based on information (in the prominent displaying) displayed on the display device 70, the necessity of the discharge amount adjustment, and thus performs the manipulation for the second pattern operation shown in the fourth data in FIG. 4. The second pattern operation will be described with reference to the flowchart in FIG. 3 and the graph in FIG. 4.

The estimative load determination part 55 of the controller 50 determines whether the estimative load determinative criterion is satisfied (step S2). At the time point denoted by the point C in FIG. 4, the estimative load determination part 55 determines that the estimative load determinative criterion is satisfied (YES in step S2) and further determines the estimative load (step S3). The estimative load is determined to 0.15 t in the specific example shown in each of FIG. 4 to FIG. 6.

Subsequently, the definitive load determination part 57 determines whether the definitive load determinative criterion is satisfied (step S4). After the estimative load is determined, the discharge amount adjustment is executed in response to the bucket pushing manipulation (first reduction manipulation) given to the manipulation lever 63A at the time point denoted by the time G in the fourth data in FIG. 4. Consequently, a portion of the soil and sand held by the bucket 16 drops from the bucket 16, and the amount of the soil and sand held by the bucket 16 reduces. However, the load acquired by the load acquisition section in a time from a completion of the first reduction manipulation (at a time point denoted by time I in FIG. 4) to a start of a subsequent bucket pushing manipulation (second reduction manipulation) (at the time point denoted by the time J in FIG. 4) is larger than the load threshold. Therefore, the definitive load determination part 57 determines that the definitive load determinative criterion is not satisfied (NO in step S4) and avoids determining the definitive load.

After that, the estimative load update part 56 determines whether the estimative load update criterion is satisfied (step S6). The controller 50 receives an input of a bucket pushing manipulation signal indicating that the bucket pushing manipulation (first reduction manipulation) is started at the time point denoted by the time G in FIG. 4, and further an elapsed time (e.g., 2 seconds in FIG. 4) from the time point (denoted by the point I in FIG. 4) at which the bucket pushing manipulation (first reduction manipulation) is completed to the time point (denoted by the point J in FIG. 4) at which a subsequent bucket pushing manipulation (second reduction manipulation) is started is equal to or longer than the time threshold. Therefore, the estimative load update part 56 determines that the estimative load update criterion is satisfied (YES in step S6), and, for example, updates the estimative load by revising the estimative load to the load held by the bucket 16 and acquired by the load acquisition section at the time point (step S7). The estimative load is updated to 0.05 t in the specific example shown in each of FIG. 4 to FIG. 6. That is to say, when the definitive load determinative criterion is not satisfied (NO in step S4) and the estimative load update criterion is satisfied (YES in step S6), the estimative load is updated, based on the load acquired by the load acquisition section after the estimative load is determined.

Subsequently, the definitive load determination part 57 determines whether the definitive load determinative criterion is satisfied (step S4). When the load acquired by the load acquisition section is equal to or smaller than the load threshold at the time point denoted by the point K in FIG. 4 in response to the bucket pushing manipulation (second reduction manipulation) given to the manipulation lever 63A at the time point denoted by the time J in the fourth data in FIG. 4, the definitive load determination part 57 determines that the definitive load determinative criterion is satisfied (YES in step S4), and further determines the estimative load as a definitive load (step S5). The definitive load is determined to 0.05 t in the specific example shown in each of FIG. 4 to FIG. 6.

As described above, in the work machine 10, the estimative load is determined when the estimative load determinative criterion including the criterion that the boom rising speed reduces in the carrying task is satisfied. Therefore, the estimative load of the object estimated to be discharged from the bucket 16 at the position above the dump truck is acquirable without a cumbersome setting operation depending on a work site. Specifically, in the carrying task, the operator gives, to the manipulation lever 61A, the boom raising manipulation of tilting the manipulation lever 61A in a predetermined direction from the neutral position to hold the lever at a specific position (e.g., at a full lever position) in the state where the manipulation lever 61A tilts for the boom raising operation. The operator then performs a restoring manipulation of restoring the manipulation lever 61A from the specific position toward the neutral position after confirming that the bucket 16 has approached the target position above the destination. Consequently, the boom rising speed starts to reduce. The restoring manipulation of reducing the boom rising speed is inevitably performed in the carrying task regardless of a situation of a work site. The timing at which the boom rising speed starts to reduce, i.e., the timing at which the restoring manipulation starts, falls within the latter half of the carrying task in many cases with a relatively small variation in the timing regardless of the situation of the work site. Hence, the estimative load determinative criterion including the reduction in the boom rising speed attributed to the start of the restoring manipulation leads to achievement in determination of the estimative load as well as suppression of the variation in the timing for determination of the estimative load in the carrying task. This configuration enables stable acquisition of the estimative load without a cumbersome setting operation depending on the situation of the work site.

Moreover, the work machine 10 further includes: the estimative load update part 56 which updates the estimative load; and the definitive load determination part 57 which determines, when the definitive load determinative criterion is satisfied, the estimative load as the definitive load of the object. The estimative load update part 56 updates, based on the load acquired by the load acquisition section after the estimative load is determined, the estimative load when the definitive load determinative criterion is not satisfied and estimative load update criterion is satisfied. The estimative load update criterion includes a criterion that a predetermined first reduction manipulation is performed after the estimative load is determined, the first reduction manipulation being for reducing the amount of the object held by the bucket 16. In the embodiment, when the first reduction manipulation is performed after the estimative load is determined, the estimative load is updated, based on the load acquired by the load acquisition section after the estimative load is determined. Accordingly, occurrence of a difference between the estimative load and the load of the object to be actually discharged at the position above the destination is suppressible.

The present invention should not be limited to the embodiment described above. The present invention covers, for example, aspects to be described below.

(A) Work Machine

The work machine is described as the hydraulic excavator 10 in the embodiment, but is not limited thereto and may be another work machine, e.g., a wheel loader.

(B) Estimative Load Determinative Criterion

The estimative load determinative criterion is a criterion that the boom rising speed reduces in the carrying task in the embodiment, but may further include another criterion in addition to this criterion.

(C) Estimative Load Update Criterion

Although the estimative load update criterion includes the reduction manipulation criterion and the time criterion in the embodiment, the present invention is not limited thereto. For instance, the estimative load update criterion may include the reduction manipulation criterion and exclude the time criterion. The estimative load update criterion may include a criterion other than the reduction manipulation criterion and the time criterion.

The time criterion is a criterion that the time from the completion of the first reduction manipulation to the start of the second reduction manipulation is equal to or longer than the predetermined time threshold in the embodiment, but is not limited thereto. The time criterion may be, for example, a criterion that a state where the definitive load determinative criterion is not satisfied continues for a time which is equal to or longer than the predetermined time threshold after the load acquired by the load acquisition section reduces through the first reduction manipulation. Updating of the estimative load is more appropriately determined even in adoption of the time criterion of this modification. In other words, the estimative load update part in this modification determines whether to update the estimative load, based on a continuous time of the state where the definitive load determinative criterion is not satisfied after the reduction in the load. Specifically, when the continuous time is equal to or longer than the time threshold, the first reduction manipulation can be considered as a manipulation for executing the discharge amount adjustment. In this case, updating of the estimative load is necessary. Hence, the estimative load update part updates the estimative load when the estimative load update criterion including the criterion that the elapsed time is equal to or longer than the time threshold is satisfied. In contrast, when the continuous time is shorter than the time threshold, the first reduction manipulation can be considered as a manipulation for performing the discharge task. In this case, updating of the estimative load is not necessary. Accordingly, the estimative load update part avoids updating the estimative load when the elapsed time does not satisfy the criterion that the elapsed time is equal to or longer than the time threshold.

(D) Definitive Load Determinative Criterion

The definitive load determinative criterion includes a criterion (load criterion) that the load acquired by the load acquisition section after the estimative load is determined is equal to or smaller than a predetermined load threshold in the embodiment, but is not limited thereto. The definitive load determinative criterion may include, for example, a criterion (angle criterion) that an angle of the bucket (e.g., the bucket angle θ3 shown in FIG. 1) in the performing of the bucket pushing manipulation is equal to or larger than a predetermined angle threshold. In other words, the definitive load determinative criterion may include at least one of the load criterion and the angle criterion.

(E) Reduction Manipulation

The second reduction manipulation is the same as the first reduction manipulation in the embodiment, but is not limited thereto, and may differ from the first reduction manipulation.

(F) Attachment

The attachment includes the bucket 16 in the embodiment, but is not limited thereto. The attachment may include other attachment, e.g., a fork, and a grapple. Each of the fork and the grapple serves as an attachment which can hold an object of a work. Each of the fork and the grapple includes a plurality of arms openable and closable to catch and hold the object of the work, like carrying goods and waste woods.

In a case where the attachment is the fork or the grapple, the estimative load is determined before the object held by the attachment interferes with (comes into contact with) objects, such as carrying goods and waste woods, having already loaded to the dump truck which is the destination. This can prevent the accuracy of the definitive load from decreasing due to the interference (contact) with the object. Consequently, even with the attachment in the form of each of the bucket, the fork, and the grapple, use of a common program succeeds in accurately definitively determining the load of the object at the same time.

(G) Task in which Estimative Load is Determined

The estimative load determination part determines the estimative load when the estimative load determinative criterion is satisfied in the carrying task after the completion of the holding task in the embodiment, but is not limited thereto. The estimative load determination part may determine the estimative load when the estimative load determinative criterion is satisfied in the holding task. In this case, the estimative load determinative criterion may be a criterion that the boom rising speed reduces in the holding task. Alternatively, the estimative load determinative criterion may be a criterion that the boom rising speed reduces in at least one of the holding task and the carrying task.

Specifically, in the hydraulic excavator 10, the boom raising manipulation and the bucket pulling manipulation may be simultaneously performed, or the boom raising manipulation, the arm pulling manipulation, and the bucket pulling manipulation may be simultaneously performed, in the holding task (excavation task) to be performed prior to the carrying task. In the holding task accompanied by the boom raising manipulation, the estimative load determination part may determine the estimative load when the criterion that the boom rising speed reduces is satisfied.

(H) Load Acquisition Section

The load of the object held by the attachment may be calculated, for example, based on a value detected by a sensor, such as a load cell sensor, attached to the attachment. In this case, the load acquisition section includes the sensor and a load calculation part which calculates, based on the value detected by the sensor, the load of the object.

(I) Other modifications

The estimative load update part and the definitive load determination part are excludable.

Conclusively, provided is a work machine which can obtain a load of an object to be discharged from an attachment at a position above a destination without a cumbersome setting operation depending on a situation of a work site.

Provided is a work machine which performs a holding task of holding an object of a work, a carrying task of carrying the object being held to a position above a destination, and a discharge task of discharging the object at the position above the destination. The work machine includes: a machine body; a working device which includes a boom tiltably supported on the machine body, and an attachment for holding the object; a load acquisition section which acquires a load of the object held by the attachment; and an estimative load determination part which determines, based on the load acquired by the load acquisition section, an estimative load of the object estimated to be discharged at the position above the destination in the discharge task when a predetermined estimative load determinative criterion is satisfied. The estimative load determinative criterion includes at least one of a criterion that a boom rising speed at which the boom rises in a rising direction reduces in the holding task, and a criterion that the boom rising speed reduces in the carrying task.

In the work machine, the estimative load is determined when the estimative load determinative criterion including at least one of the criterion that the boom rising speed reduces in the holding task and the criterion that the boom rising speed reduces in the carrying task is satisfied. Therefore, the estimative load of the object estimated to be discharged from the attachment at the position above the destination is acquirable without a cumbersome setting operation depending on a work site.

In the work machine, the estimative load determinative criterion may be the criterion that the boom rising speed reduces in the carrying task, and the estimative load determination part may be configured to determine the estimative load when the estimative load determinative criterion is satisfied in the carrying task.

Occurrence of a difference between the estimative load and the load of the object to be actually discharged at the position above the destination is suppressible more effectively in this aspect where the estimative load is determined in the carrying task than in the case where the estimative load is determined in the holding task. Specifically, in the carrying task to be performed prior to the discharge task, a portion of the object, such as the soil and sand, held by the attachment may drop from the attachment due to, for example, vibration occurring at the attachment in the carrying task. In this respect, the configuration where the estimative load is determined in the carrying task to be performed subsequently to the holding task can bring the timing for the determination of the estimative load closer to the timing of the start of the discharge task than the configuration where the estimative load is determined in the holding task. This can achieve a smaller difference between the estimative load and the load of the object to be actually discharged at the position above the destination.

Meanwhile, an operator of the hydraulic excavator serving as an example of the work machine occasionally performs the following reduction manipulation before a start of the discharge task after an excavation task (which is an example of the holding task). Specifically, the reduction manipulation includes reducing the amount of soil and sand (which is an example of the object) held by the bucket (which is an example of the attachment) by discharging, from the bucket, a portion of the soil and sand held by the bucket, and adjusting the amount (discharge amount) of the object to be discharged at the position above the dump truck (which is an example of the destination). If the reduction manipulation is performed before the start of the discharge task after the determination of the estimative load, a difference may occur between the estimative load and the load of the object to be actually discharged at the position above the destination. To avoid the occurrence, the work machine preferably further includes the configuration described below for the reduction manipulation.

Specifically, the work machine may further include: an estimative load update part which updates the estimative load; and a definitive load determination part which determines, when a predetermined definitive load determinative criterion for determining a definitive load of the object to be actually discharged at the position above the destination in the discharge task is satisfied, the estimative load as the definitive load. The estimative load update part may update, based on the load acquired by the load acquisition section after the estimative load is determined, the estimative load when the definitive load determinative criterion is not satisfied and a predetermined estimative load update criterion is satisfied. The estimative load update criterion may include a criterion that a predetermined first reduction manipulation is performed after the estimative load is determined, the first reduction manipulation being for reducing an amount of the object held by the attachment.

In this aspect, when the first reduction manipulation is performed after the estimative load is determined, the estimative load is updated, based on the load acquired by the load acquisition section after the estimative load is determined. Accordingly, such occurrence of the difference between the estimative load and the load of the object to be actually discharged at the position above the destination is suppressible.

In the work machine, the estimative load update criterion may further include a criterion that a time from a completion of the first reduction manipulation to a start of a second reduction manipulation is equal to or longer than a predetermined time threshold, the second reduction manipulation being for reducing, after the completion of the first reduction manipulation, an amount of the object held by the attachment.

In the aspect, updating of the estimative load is more appropriately determined. Hereinafter, more details will be described. In this aspect, the estimative load update part determines whether to update the estimative load, based on an elapsed time from the completion of the first reduction manipulation to the start of the second reduction manipulation. Specifically, when the elapsed time is equal to or longer than the time threshold, the first reduction manipulation and the second reduction manipulation are intermittent or discontinuous, and thus the first reduction manipulation can be considered as a manipulation for adjusting the discharge amount. In this case, updating of the estimative load is necessary. Hence, the estimative load update part updates the estimative load when the estimative load update criterion including the criterion that the elapsed time is equal to or longer than the time threshold is satisfied. In contrast, when the elapsed time is shorter than the time threshold, the first reduction manipulation and the second reduction manipulation are considered as a series of manipulations. In this case, updating of the estimative load accompanied by the first reduction manipulation is not necessary. Accordingly, the estimative load update part avoids updating the estimative load when the elapsed time does not satisfy the criterion that the elapsed time is equal to or longer than the time threshold.

In the work machine, the definitive load determinative criterion may include a criterion that the load acquired by the load acquisition section after the estimative load is determined is equal to or smaller than a predetermined load threshold.

In this aspect, the discharge task is determined as having been performed when the load reduces to reach a value equal to or smaller than the load threshold, and thus the estimative load can be determined as the definitive load.

In the work machine, an attachment discharge manipulation may be set as the first reduction manipulation, the attachment discharge manipulation being for causing the attachment to discharge at least a portion of the object held by the attachment.

In this aspect, the estimative load is appropriately updatable when the attachment discharge manipulation is performed.

In the work machine, the working device may further include an arm rotatably attached to a distal end of the boom and having a distal end to which the attachment is attached. The attachment may include a bucket. An arm pushing manipulation may be further set as the first reduction manipulation, the arm pushing manipulation being for pushing the arm in a direction in which the leading end of the arm moves away from the boom, and the estimative load update part may update the estimative load when at least one of the attachment discharge manipulation and the arm pushing manipulation is detected.

In this aspect, the estimative load is appropriately updatable when at least one of the attachment discharge manipulation and the arm pushing manipulation is performed.

The invention claimed is:

1. A work machine which performs a holding task of holding an object of a work, a carrying task of carrying the object being held to a position above a destination, and a discharge task of discharging the object at the position above the destination, the work machine comprising:
   a machine body;
   at least one manipulation lever;
   a working device which includes a boom tiltably supported on the machine body, and an attachment for holding the object; and
   circuitry configured to:
      acquire a load of the object held by the attachment; and
      determine, based on the load acquired, an estimative load of the object estimated to be discharged at the position above the destination in the discharge task when a predetermined estimative load determinative criterion is satisfied,
   wherein the estimative load determinative criterion includes at least one of a criterion that a boom rising speed at which the boom rises in a rising direction reduces in the holding task, and a criterion that the boom rising speed reduces in the carrying task, and
   wherein the at least one manipulation lever is configured to be adjusted to discharge at least a portion of the object at the position above the destination after the predetermined estimative load determinative criterion is satisfied.

2. The work machine according to claim 1, wherein
   the estimative load determinative criterion is the criterion that the boom rising speed reduces in the carrying task, and
   the circuitry determines the estimative load when the estimative load determinative criterion is satisfied in the carrying task.

3. The work machine according to claim 1, wherein the circuitry is further configured to:
   update the estimative load; and
   determine, when a predetermined definitive load determinative criterion for determining a definitive load of the object to be actually discharged at the position above the destination in the discharge task is satisfied, the estimative load as the definitive load, wherein
   the circuitry updates, based on the load acquired after the estimative load is determined, the estimative load when the definitive load determinative criterion is not satisfied and a predetermined estimative load update criterion is satisfied, and
   the estimative load update criterion includes a criterion that a predetermined first reduction manipulation is performed after the estimative load is determined,
   the first reduction manipulation being for reducing an amount of the object held by the attachment.

4. The work machine according to claim 3, wherein
   the estimative load update criterion further includes a criterion that a time from a completion of the first reduction manipulation to a start of a second reduction manipulation is equal to or longer than a predetermined time threshold,
   the second reduction manipulation being for reducing an amount of the object held by the attachment after the completion of the first reduction manipulation.

5. The work machine according to claim 3, wherein
the definitive load determinative criterion includes a criterion that the load acquired after the estimative load is determined is equal to or smaller than a predetermined load threshold.

6. The work machine according to claim 3, wherein
an attachment discharge manipulation is set as the first reduction manipulation, the attachment discharge manipulation being for causing the attachment to discharge at least a portion of the object held by the attachment.

7. The work machine according to claim 6, wherein,
the working device further includes an arm rotatably attached to a distal end of the boom and having a distal end to which the attachment is attached,
the attachment includes a bucket,
an arm pushing manipulation is further set as the first reduction manipulation, the arm pushing manipulation being for pushing the arm in a direction in which the leading end of the arm moves away from the boom, and
the circuitry updates the estimative load when at least one of the attachment discharge manipulation and the arm pushing manipulation is detected.

\* \* \* \* \*